United States Patent
Matsui

(10) Patent No.: US 8,282,262 B2
(45) Date of Patent: Oct. 9, 2012

(54) LIGHT GUIDING PANEL ASSEMBLY FOR DISPLAY, SIGNBOARD, SURFACE ILLUMINATION OR THE LIKE

(75) Inventor: Hirokazu Matsui, Otsu (JP)

(73) Assignee: Meitaku Industry Co., Ltd., Otsu-Shi, Shiga (JP)

( * ) Notice: Subject to any disclaimer, the term of this patent is extended or adjusted under 35 U.S.C. 154(b) by 54 days.

(21) Appl. No.: 12/894,577

(22) Filed: Sep. 30, 2010

(65) Prior Publication Data

US 2011/0103092 A1    May 5, 2011

(30) Foreign Application Priority Data

Oct. 29, 2009  (JP) ................................. 2009-249143

(51) Int. Cl.
*F21V 7/04* (2006.01)
(52) U.S. Cl. ......... 362/634; 362/633; 362/610; 362/294
(58) Field of Classification Search .................... 362/30, 362/294, 559, 600, 604, 608–613, 615–617, 362/621, 623–627, 632–634; 349/58–62, 349/65, 67, 68
See application file for complete search history.

(56) References Cited

U.S. PATENT DOCUMENTS

| | | | |
|---|---|---|---|
| 7,782,418 B2 * | 8/2010 | Ke et al. | 349/58 |
| 7,866,873 B2 * | 1/2011 | Ohno | 362/633 |
| 7,883,259 B2 * | 2/2011 | Hung et al. | 362/634 |
| 2007/0030696 A1 | 2/2007 | Lv et al. | |
| 2009/0097277 A1 | 4/2009 | Iwasaki | |

FOREIGN PATENT DOCUMENTS

| | | |
|---|---|---|
| JP | 2009-123557 | 6/2009 |
| KR | 1020050005166 A | 1/2005 |
| KR | 1020060020345 A | 3/2006 |

OTHER PUBLICATIONS

European Patent Office, European Search Report, Application No. EP 10 18 8913, Dec. 20, 2011.

* cited by examiner

Primary Examiner — Hargobind S Sawhney
(74) Attorney, Agent, or Firm — Quarles & Brady LLP

(57) ABSTRACT

A light source receiver 31 is disposed adjacent to an incident end face 11 of a light guiding plate 1 using the light source holder 31 for receiving the LED unit 4 and a light source holder 3 formed in an L-shape in a cross section having a standing plate 34 at one end of the light source holder 31, the standing plate 34 is disposed outside of a reflective plate 2 laminated on the light guiding plate 1, and a bolt 81 via a long hole 35 of the standing plate 34 is screwed into an insert-nut 8 of the light guiding plate 1 via a clearance hole 21 of the reflective plate 2, thereby the standing plate 34 follows the heat expansion or contraction of the light guiding plate 1 except the reflective plate 2. A relative position between the incident end face 11 of the light guiding plate 1 and the light source receiver 31 of the light source holder 3 is always constant, and the LED unit 4 is prevented from being damaged.

7 Claims, 5 Drawing Sheets

3(34)   8   35

US 8,282,262 B2

LIGHT GUIDING PANEL ASSEMBLY FOR DISPLAY, SIGNBOARD, SURFACE ILLUMINATION OR THE LIKE

CROSS REFERENCE TO RELATED APPLICATIONS

This application is on the basis of Japanese Patent Application No. 2009-249143, the contents of which are hereby incorporated by reference.

BACKGROUND OF THE INVENTION

1. Field of the Invention

The present invention relates to a light guiding panel assembly used for a display or a signboard in which a positive film disposed on a surface of a guiding plate is illuminated from backward by a guided light from a light source via the guiding plate, and used for a surface illumination panel with a guided light via the guiding plate.

2. Description of the Related Art

Patent document 1 listed below by an inventor of this application discloses such a light guide panel assembly. According to this document, the light guide panel assembly includes: a light guiding plate made of synthetic resin, and guiding light provided via an incident end face from a light source; a base plate disposed on a rear wall of the guiding plate; and the light source such as an LED unit disposed adjacent to the incident end face of the guiding plate. The light guide panel assembly further includes: a light diffuser plate disposed on a front wall of the guiding plate; a transparent cover disposed on a front wall of the light diffuser plate; and a frame covering each end of these components, and integrally fixing the base plate with a fixing means such as adhesive, screw or the like. Thus, a positive film is clipped between the light diffuser plate and the transparent cover, and used as a display or a signboard by back-lighting of the positive film with a guided light via the light guiding plate. In this case, the light source is an LED unit composed of LED chips arranged series on a substrate. When the substrate is fixed to an inner bottom wall of the frame with the fixing means such as adhesive, the incident light from the LED chips of the LED unit is supplied to the light guiding plate.

[Patent Document 1] JP, A, 2009-123557

In this case, a thin light guiding panel assembly which is relatively large-sized such as A1 size, B1 size, or a large panel 1 to 2 meters on a side can illuminate back-lighting with high brightness. However, because the light guiding plate is made of synthetic resin such as an acrylic transparent resin, when the light guiding panel assembly is located at a high-temperature place, for example, the light guiding panel assembly exposed outdoors facing south and receiving the direct light of the sun, due to heat expansion of the guiding plate, there is a possibility that the light guiding panel assembly may not light and the back-lighting may be impossible.

In other words, when the light source is the LED unit, the LED unit is fixed to the inner bottom wall of the frame. A heat expansion coefficient of the acrylic transparent resin plate is $6.8 \times 10^{-5}$/K. When the temperature is changed in 10 degree C., the plate is expanded or contracted 0.7 mm per 1 meter in both width and height direction. Thus, the heat expansion or heat contraction of the light guiding plate is slightly over 2 mm each at the temperature change of 30 degree C., slightly less than 3 mm each at the temperature change of 40 degree C., and slightly less than 3.5 mm at the temperature change of 50 degree C. Therefore, when the frame having the light source is fixed to the base plate, for example, due to the heat expansion at the incident end face in a width direction of the light guiding plate, the incident end face of the light guiding plate pushes the light source, and due to the heat expansion in a height direction of the light guiding plate, a tensile force is applied to the LED unit to expand the LED unit. Resultingly, a substrate of the LED unit or a connecting part of the LED unit may be broken, or damaged.

In this case, when a gap is provided between the light guiding plate and the light source, the gap absorbs the heat expansion of the light guiding plate to prevent the LED unit from being broken or damaged. However, when a gap is provided, incident light of the light source is decreased inversely proportional to the square of a distance of the gap, and the illumination brightness of the light guiding panel assembly is decreased. The gap which generates no decrease of the illumination brightness is limited to about 1 mm. Therefore, even if such a gap is provided, when the thermal expansion exceeds the gap, similarly, the tensile force is applied to the LED unit and the LED unit may be broken or damaged.

Recently, a large-sized light guiding panel assembly has been installed out of doors such as a time table on a station platform, a guiding board in an open space in front of a building or on a wall surface of a building. Therefore, it is necessary to eliminate the possibility of a trouble caused by heat expansion or contraction of the light guiding plate accompanying the temperature change.

Accordingly, an object of the present invention is to provide a light guiding panel assembly used for a display, a signboard, a surface illumination or the like configured to simply and surely prevent a trouble caused by heat expansion or contraction without causing the decrease of illumination brightness while using a synthetic resin made light guiding plate in which the heat expansion or contraction is inevitable.

SUMMARY OF THE INVENTION

In order to attain the object, according to the present invention, there is provided a light guiding panel assembly used for a display, a signboard, a surface illumination or the like, including:

a synthetic-resin-made light guiding plate for guiding incident light from a light source via an incident end face; and a light source holder extending to the incident end face of the guiding plate, wherein the light source holder integrally includes: a light source receiver having a light transparent hole at the incident end face side; and a standing plate standing from the light source receiver, and is formed in an L-shape, and wherein the light source is received in the light source receiver of the light source holder to provide the incident light to the incident end face, and the light guiding plate and the standing plate are movable, and the standing plate is integrally fixed to the light guiding plate, so that the light guiding holder can follow heat expansion or contraction of the light guiding plate.

Preferably, the light guiding panel assembly further including a base plate disposed on a rear wall of the guiding plate, and the standing plate is integrally fixed to the light guiding plate with a fitting, and the fitting is inserted into a through-hole or a through-groove allowing the fitting movable in a heat expansion direction of the light guiding plate disposed on the base plate.

Preferably, the standing plate is integrally fixed to the light guiding plate at a position adjacent to a corner of the light guiding plate, and the standing plate is movable from the position adjacent to the corner of the light guiding plate so that the light guiding holder can follow heat expansion or contraction of the light guiding plate at the position adjacent to the corner of the light guiding plate.

Preferably, the standing plate is integrally fixed to the light guiding plate at the position adjacent to the corner of the light guiding plate with a fitting inserted from a long hole in an oblique direction of the standing plate into the light guiding plate.

Preferably, the standing plate is integrally fixed to the light guiding plate with a bolt screwed from the standing plate into an insert-nut embedded in the light guiding plate.

Preferably, the light source holder includes a decoration plate standing toward a front wall of the light guiding plate for covering an end at the incident end face, and is formed in a U-shape in a cross section, so that the light source holder also serves as a frame.

Preferably, the light guiding panel assembly further includes: a frame having a U-shaped section and disposed outside of the light source holder for covering an end of the light guiding panel assembly at the incident end face, and a rear-side standing wall of the frame is simultaneously fixed to the light guiding plate with a fitting together with the standing plate of the light source holder so that the frame can follow the heat expansion or contraction of the light guiding plate together with the light source holder.

Preferably, the light source is an LED unit composed of LED chips arranged in series in a longitudinal direction of a substrate, and the light receiver of the light source holder is formed in a C-shape in a cross section having an open groove as a light transmitting hole. Further, an end of the light guiding plate is operable to contact projections opposite to each other disposed at both ends of the opening groove, and spacers are held between the substrate and the projections by a crossed-arrangement of the spacers on the substrate in between the LED chips and covered by the projections, thereby the LED unit is received in the light source receiver of the light source holder.

These and other objects, features, and advantages of the present invention will become more apparent upon reading of the following detailed description along with the accompanied drawings.

DETAILED DESCRIPTION OF THE PREFERRED EMBODIMENTS

Figure 1:
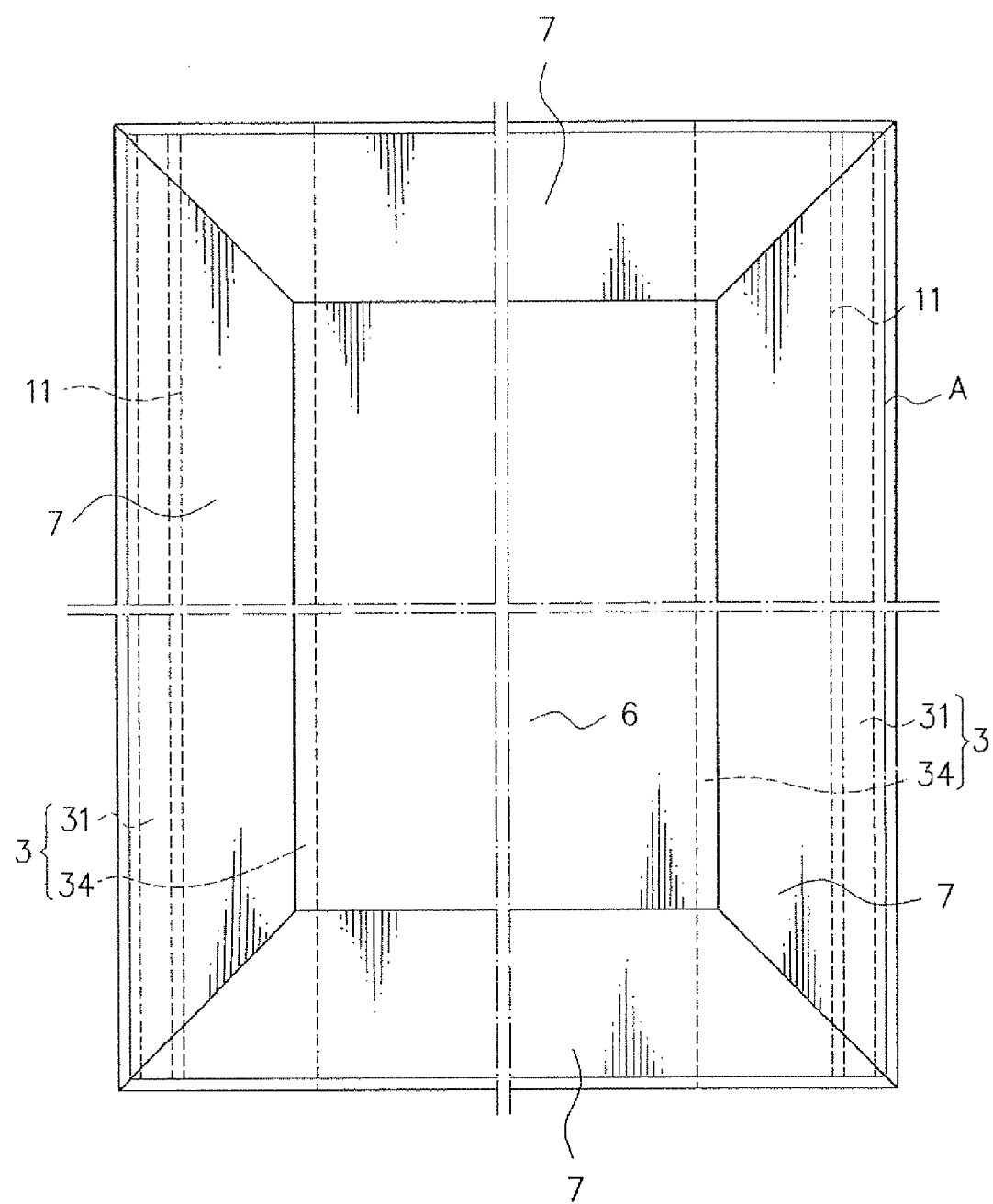
FIG. 1 is a front view of a light guiding panel assembly.
Figure 2:
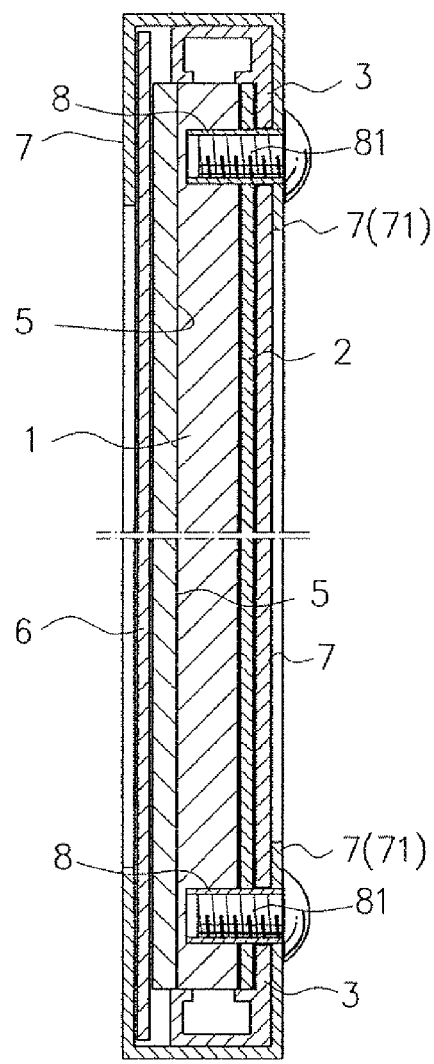
FIG. 2 is a transverse sectional view of the light guiding panel assembly.
Figure 3:
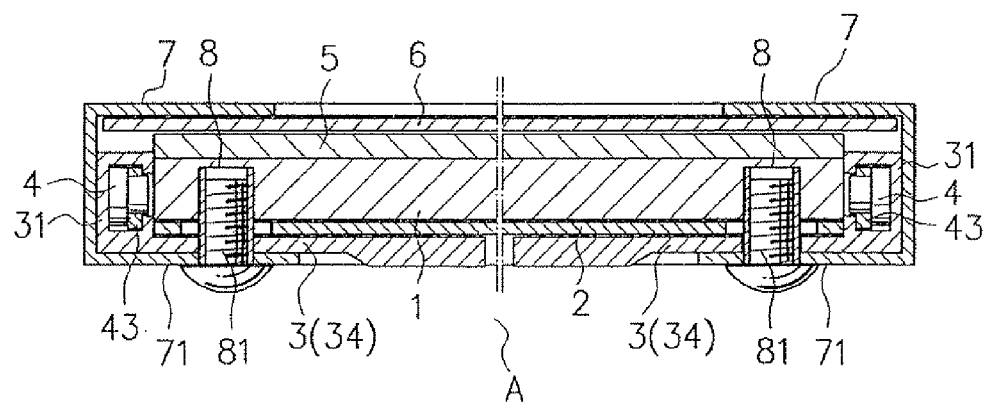
FIG. 3 is a longitudinal sectional view of the light guiding panel assembly.
Figure 4:
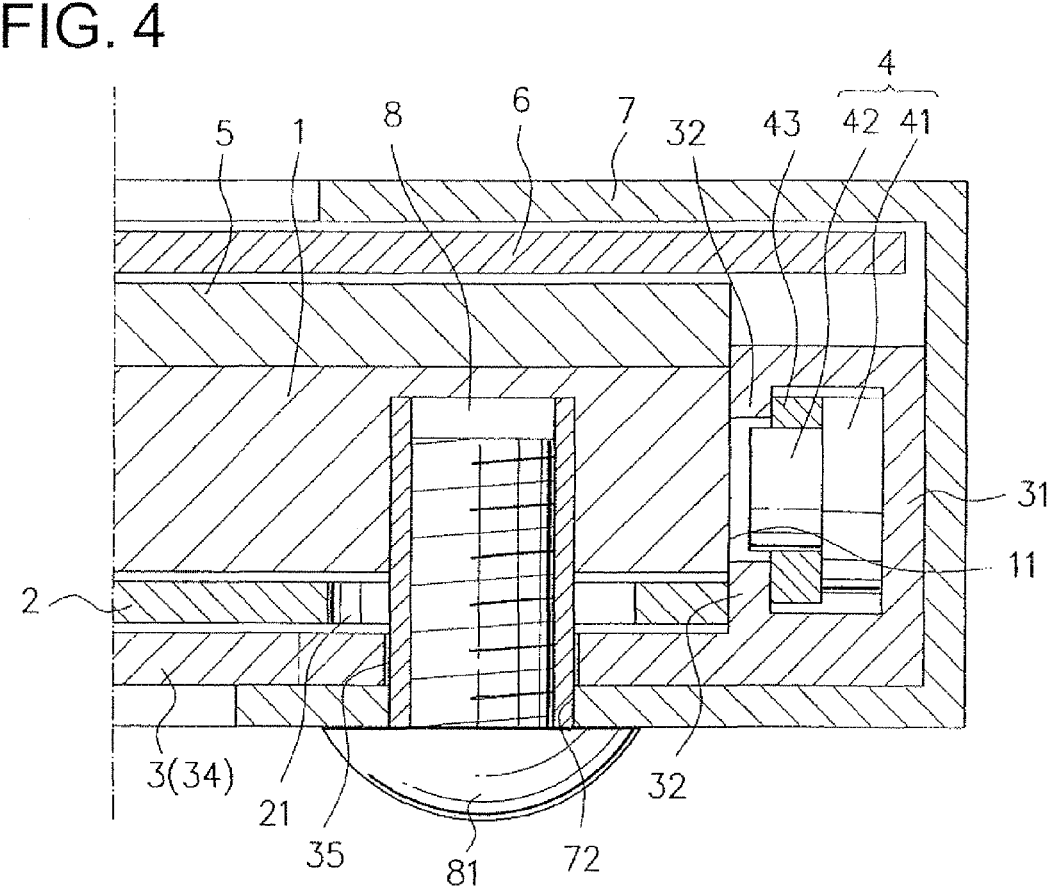
FIG. 4 is a partially enlarged view of FIG. 3.
Figure 5:
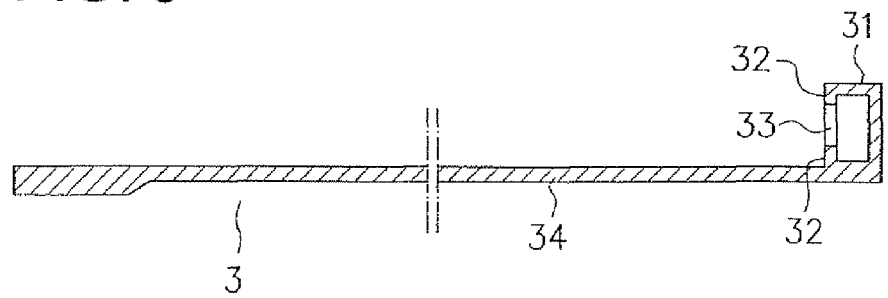
FIG. 5 is a sectional view of a light source holder.
Figure 6:
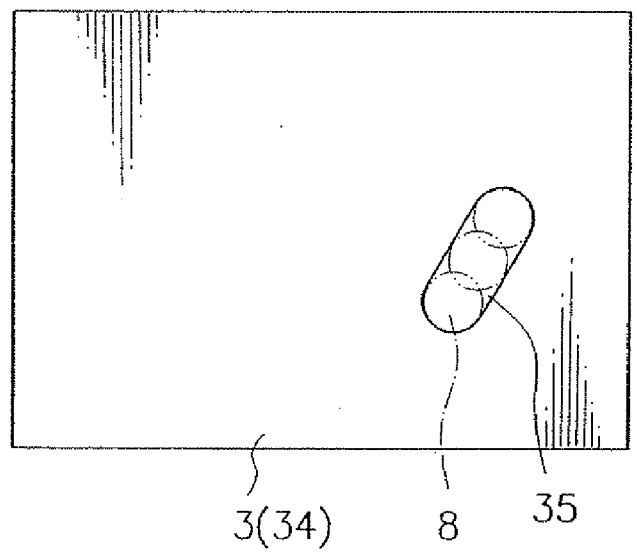
FIG. 6 is a partially rear view showing a long hole of a standing plate.
Figure 7:
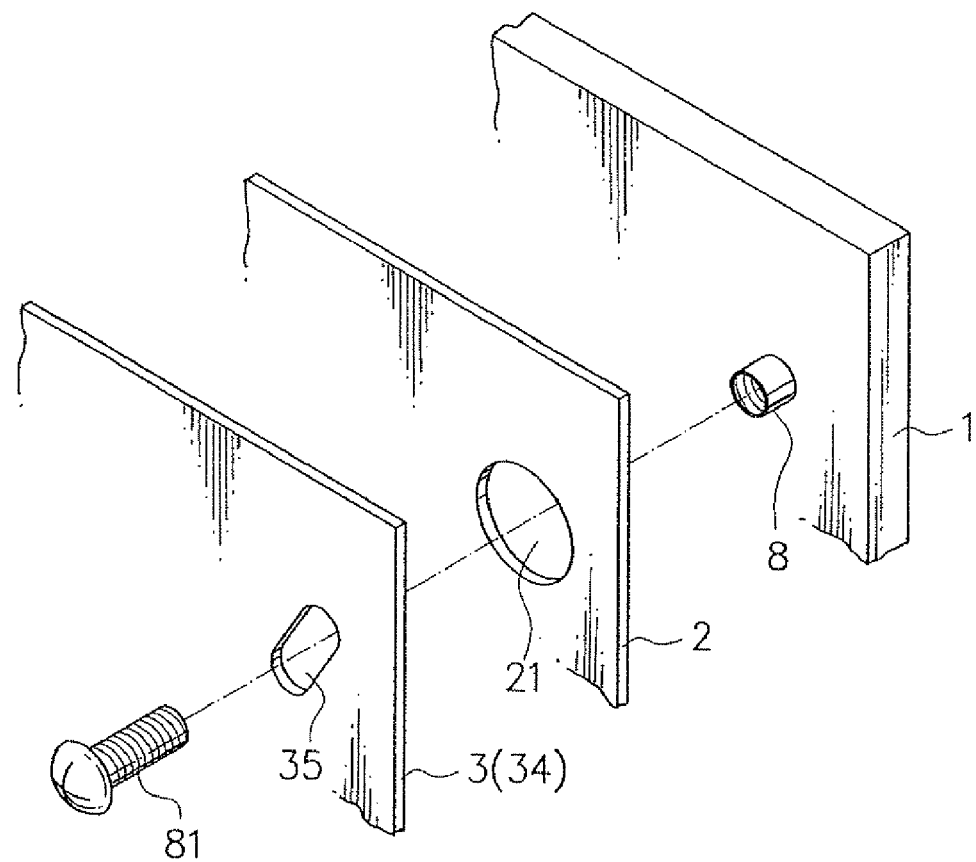
FIG. 7 is an exploded perspective view showing a relationship among a light guiding plate, a base plate, and the light source holder.

Hereinafter an embodiment of the present invention will be concretely explained with reference to the drawings. As shown in FIGS. 1 to 7, a light guiding panel assembly A is a large-size vertically long light guiding panel assembly, for example, a little bit larger than 1 meter×2 meter. The light guiding panel assembly includes: a synthetic-resin-made light guiding plate 1 for guiding incident light supplied via an incident end face 11 from a light source; a base plate 2 disposed on a rear wall of the light guiding plate 1; and a light source holder 3 clipping the base plate 2 and extended to the incident end face 11 and a rear end of the base plate 2. In this embodiment, the light guiding panel assembly A further includes: a light diffuser panel 5 disposed on a front wall of the light guiding plate 1; a transparent cover 6 disposed on a front wall of the light diffuser panel 5; and a frame 7 having a U-shaped section for covering an end of the light guiding panel assembly A at the incident end face 11 side and disposed outside of the light source holder 3. This light guiding panel assembly A is used as a display, a signboard or the like when a not-shown positive film displaying such as a timetable of a station, a guide or an advertisement at an open space in front of a building or a wall of a building using characters, photos, figures or the like is interposed between the light diffuser panel 5 and the transparent cover 6, the light source is on to supply incident light to the incident end face 11 of the light guiding plate 1, and a not-shown light guiding pattern printed on a rear wall of the light guiding plate 1 guides the incident light, thereby back-lighting of the positive film is performed.

In this embodiment, the light guiding plate 1 is sized vertically long 1*2 meter and several mm, for example, 5 mm thick acrylic transparent resin plate. A molded or printed light guiding pattern is disposed on a rear wall of the light guiding plate 1. As the guiding pattern is further away from the light source, the pattern density is increased. Both right and left ends facing each other of the light guiding plate 1 are incident end faces 11. In this embodiment, an LED unit 4 as the light source is disposed adjacent to the incident end face 11. The LED unit 4 is composed of LED chips 42 arranged in series in a longitudinal direction of a substrate 41. A reflective sheet made of white synthetic resin having high reflectivity is laminated on the base plate 2 to compose a reflective plate. In this embodiment, the base plate 2 is, for example, about 1 to 2 mm-thick aluminum plate. The light diffuser panel 5 is about 1 to 2 mm-thick milky white semi-transparent synthetic resin to uniformize illumination light by diffusing the illumination light from the light guiding pattern. The transparent cover 6 is made of transparent synthetic resin having high light transmission factor and holds the positive film together with the light diffuser panel 5 to protect the positive film.

At this time, the light source holder 3 integrally includes: a light source receiver 31 having a light transparent hole 33 at the incident end face side 11; and a standing plate 34 standing toward the rear wall of the base plate 2 from the light source receiver 31, and is formed in an L-shape. Further, the light source is received in the light source receiver 31 of the light source holder 3 to provide the incident light to the incident end face 11, and the light guiding plate 1 and the standing plate 34 sandwiching the base plate 2 is movable relative to the base plate 2, and the standing plate 34 is integrally fixed to the light guiding plate 1, so that the light guiding holder 3 can follow heat expansion or contraction of the light guiding plate 1.

In this embodiment, the light receiver 31 of the light source holder 3 is formed in a C-shape in a cross section having an open groove as a light transmitting hole 33. Further, an end of the light guiding plate 1 is able to contact projections 32 opposite to each other disposed at both ends of the opening groove, and spacers 43 are held between the substrate 41 and the projections 32 by a crossed-arrangement of the spacers 43 on the substrate 41 in between the LED chips 42 and covered by the projections 32, thereby the LED unit 4 is received in the light source receiver 31 of the light source holder 3. The light source holder 3 of this embodiment is made of extrusion molding product, for example, about 1 to 2 mm-thick aluminum extrusion plate which is long corresponding to the length of the incident end face 11 of the light guiding plate 1. The extrusion molding product has an L-shaped section, and includes: the light receiver 31 having a C-shaped section; and the standing plate 34 extending vertically from one end of the light receiver 31. In this embodiment, the light receiver 31 has a rectangular section with, for example, about 1 cm width and about 0.5 cm depth. Further, the light receiver 31 has a C-shaped cross section composed of the projections 32 opposite to each other having about 1 to 2 mm width, and the light transmitting hole 33 having several mm width in a direction perpendicular to a standing direction of the standing plate 34. The standing plate 34 is extended vertically having, for example, about 10 cm height. Thereby, the light source holder 3 is formed in an L-shape in cross section.

Regarding the arrangement of the light source, namely, the LED unit 4 in the light source holder 3, the LED unit 4 having the LED chips 42 arranged in series and having the same length as the light receiver 31 of the light source holder 3 is slidingly attached to the light source holder 3 from an end of the light source holder 3 in a longitudinal direction so that the LED chips 42 face the light transmitting hole 33, and the substrate 41 is disposed on a bottom wall of the light receiver 31. Then, spacers 43 such as cushion material are inserted into between the LED chips 43 in specific intervals via the light transmitting hole 33, and both ends of the spacers are held by a rear wall of the projections 32 opposite to each other. Thus, when a trouble such as a bad connection occurs, the fixing of the LED unit 4 is easily canceled by hooking and removing the spacers 43 made of cushion material with a driver or the like, so that the LED unit 4 can be changed as easy as possible.

In the light source holder 3, the light transmitting hole 33 of the light receiver 31 faces the incident end face 11 of the light guiding plate 1 disposed at both ends in a width direction of the light guiding plate 1. The projections 32 opposite to each other are disposed adjacent to or in contact with the ends of the incident end face 11. The standing plate 34 is overlapped with a rear wall of the base plate 2. The standing plate 34 is integrally fixed to the light guiding plate 1. The base plate 2 is sandwiched between the light guiding plate 1 and the standing plate 34 of the light source holder 3. The light guiding plate 1 and the standing plate 34 are movable relative to the base plate 2.

In this embodiment, the standing plate 34 is integrally fixed to the light guiding plate 1 with a fitting, and the fitting is inserted into a through-hole or a through-groove such as a clearance hole or a notching groove allowing the fitting movable in a heat expansion direction of the light guiding plate 1 disposed on the base plate 2. Further, the standing plate 34 is integrally fixed to the light guiding plate 1 at a position adjacent to a corner of the light guiding plate 1, and the standing plate 34 is movable in an oblique direction from the position adjacent to the corner of the light guiding plate 1, so that the light guiding holder 3 can follow heat expansion or contraction of the light guiding plate 1 at the position adjacent to the corner of the light guiding plate 1. Further, the standing plate 34 is integrally fixed to the light guiding plate 1 at the position adjacent to the corner of the light guiding plate 1 with a fitting inserted from a long hole 35 in an oblique direction of the standing plate 34 into the light guiding plate 1. In this embodiment, the standing plate 34 is integrally fixed to the light guiding plate 1 with a bolt 81 screwing from the standing plate 34 into an insert-nut 8 embedded in the light guiding plate 1. The fitting, namely, the insert-nut 8 is embedded in the light guiding plate 1 at the position adjacent to the corner of the light guiding plate 1, and a bolt 81 is screwed into the insert-nut 8 from the standing plate 34, in this embodiment, from the later-described frame 7 to integrally fix the light guiding plate 1, the base plate 2, the standing plate 34, namely, the light source holder 3, and the frame 7.

Regarding the integral fixation of the base plate 2 via the through-hole or a through-groove, a clearance hole of which diameter is larger than an outer diameter of the insert-nut 8, in this embodiment, a clearance hole 21 of which diameter is substantially equal to a longer diameter of the long hole 35 is penetrated through the base plate 2, so that the insert-nut 8 into which the bolt 81 is screwed is movable in a range of the clearance hole 21. Thereby, when the base plate 2 is sandwiched between the light guiding plate 1 and the standing plate 34, and the heat expansion or contraction is generated in the light guiding plate 1, the standing plate 34, namely, the light source holder 3 follows to move relative to the light guiding plate 1, while the sandwiched base plate 2 is independently movable. Therefore, a difference of the heat expansion or contraction between the light guiding plate 1 and the base plate 2 which is made of aluminum plate is absorbed, and the fixation condition is maintained.

On the other hand, regarding the integral fixation of the standing plate 34, the long hole 35 in the oblique direction is provided. When this integral fixation is made around the center of the incident end face 11 of the light guiding plate 1, the heat expansion or contraction generates in one direction, and in a width direction in this embodiment. Accordingly, when a circular penetrating hole, namely, a circular hole corresponding to an outer diameter of the insert-nut 8 is disposed on the standing plate 34, the light source holder 3 can follow the heat expansion or contraction. However, when the integral fixation is made around the corner of the light guiding plate 1, namely, around both ends of the standing plate 34 of the light source holder 3 in the longitudinal direction, the heat expansion or contraction around the corner of the light guiding plate 1 simultaneously generates in both vertical and horizontal direction. Therefore, a circular hole similar to the circular hole at the center position cannot absorb the heat expansion or contraction. Further, if a through-hole or a though-groove such as the clearance hole for allowing the fitting movable similar to the base plate 2 instead of the circular hole is disposed, when the heat expansion is generated, the light source holder 3 can follow to move in a separating direction. However, when the heat contraction is generated, the light source holder 3 cannot follow to move in an approaching direction. Therefore a distance between the light source holder 3 and the incident end face 11 of the light guiding plate 1 is changed. Thus, in this case, after the heat expansion or contraction, the brightness of the light guiding panel assembly A may be reduced.

The integral fixation with a long hole 35 in the oblique direction on the standing plate 34 around the corner of the light guiding plate 1 allows the standing plate 34 to follow the heat expansion or contraction. Namely, when the heat expansion is generated in the light guiding plate 1, the fitting, namely, the insert-nut 8 is moved in the oblique direction according to the long hole 35 of the standing plate 34, so that the light source holder 3 is moved away from the incident end face 11 in the separating direction. On the other hand, when the heat contraction is generated, the insert-nut 8 is moved back in the oblique direction, so that the light source holder 3 is moved toward the incident end face 11 in the approaching direction. Accordingly, by arranging the long hole 35 in the oblique direction, a distance between the light source holder 3 and the incident end face 11 of the light guiding plate 1 is kept always constant, and a relative position can be unchanged, so that the brightness change of the light guiding panel assembly A generated by the heat expansion or contraction can be dissolved.

The long hole 35 in the oblique direction is disposed on the standing plate 34 corresponding to an area of the light guiding plate 1, for example, disposed on or around a diagonal line of the light guiding plate 1 corresponding to an angle of the diagonal line. The length of the long hole 35 corresponds to an amount of heat expansion or contraction on the diagonal line. At this time, the width of the long hole 35 corresponds to an outer diameter of the fitting, namely, insert-nut 8 to allow the insert-nut 8 movable. In the vertically long 1 meter*2 meter light guiding plate 1 of this embodiment, the diagonal line angle of the long hole 35 is 63.5 degree. The length of the long hole 35 is about two to three times larger than the diameter of the fitting, namely, the insert-nut 8. Thus, by moving the position of the insert-nut 8, with the integral fixation, the heat expansion or contraction of the light guiding plate 1 is absorbed, and the relative position between the light source holder 3 and the incident end face 11 is unchanged.

In this embodiment, a frame 7 has a U-shaped section and is disposed outside of the light source holder 3. Further, a rear-side standing wall 71 of the frame 7 is simultaneously fixed to the light guiding plate 1 with a fitting together with the standing plate 34 of the light source holder 3, so that the frame 7 can follow the heat expansion or contraction of the light guiding plate 1 together with the light source holder 3. At this time, positional relationship between the rear-side standing wall 71 of the frame 7 and the standing plate 34 of the light source holder 3 is not changed. Therefore, the frame 7 is fixed with the bolt 81 screwing into the insert-nut 8 via a round hole 72 penetrating into the rear-side standing wall 71, the long hole 35 on the standing plate 34, and the penetrating hole or the penetrating groove (the clearance hole 21 in this embodiment) on the base plate 2 for allowing the frame 7 movable relative to the light guiding plate 1 together with the light source holder 3. At this time, because the frame 7 is moved together with the standing plate 34 of the light source holder 3, when corners of the frame 7 in the longitudinal direction are finished in contact with each other as shown in FIG. 1, a gap may be generated at the contacting parts with the heat expansion or contraction. In this case, a step is formed on one or both of the contacting parts so that the finishing parts are overlapped with each other, thereby the gap is absorbed, and prevented from being exposed.

Incidentally, in this embodiment, in a non-incident end face of the light guiding plate 1, namely, the facing end face perpendicular to the incident end face 11, the standing plate 34 of the light source holder 3 having no light source is disposed on a rear wall of the base plate 2, and the frame 7 is disposed outside thereof. At this time, because there is no possibility to occur any trouble at the incident end face 11 side, the standing plate 34 and the frame 7 are directly fixed, and in this embodiment, the fixation is done by the bolt 81 screwing into the insert-nut 8 disposed on the light guiding plate 1 via the round hole of the frame 7.

Figure 8:
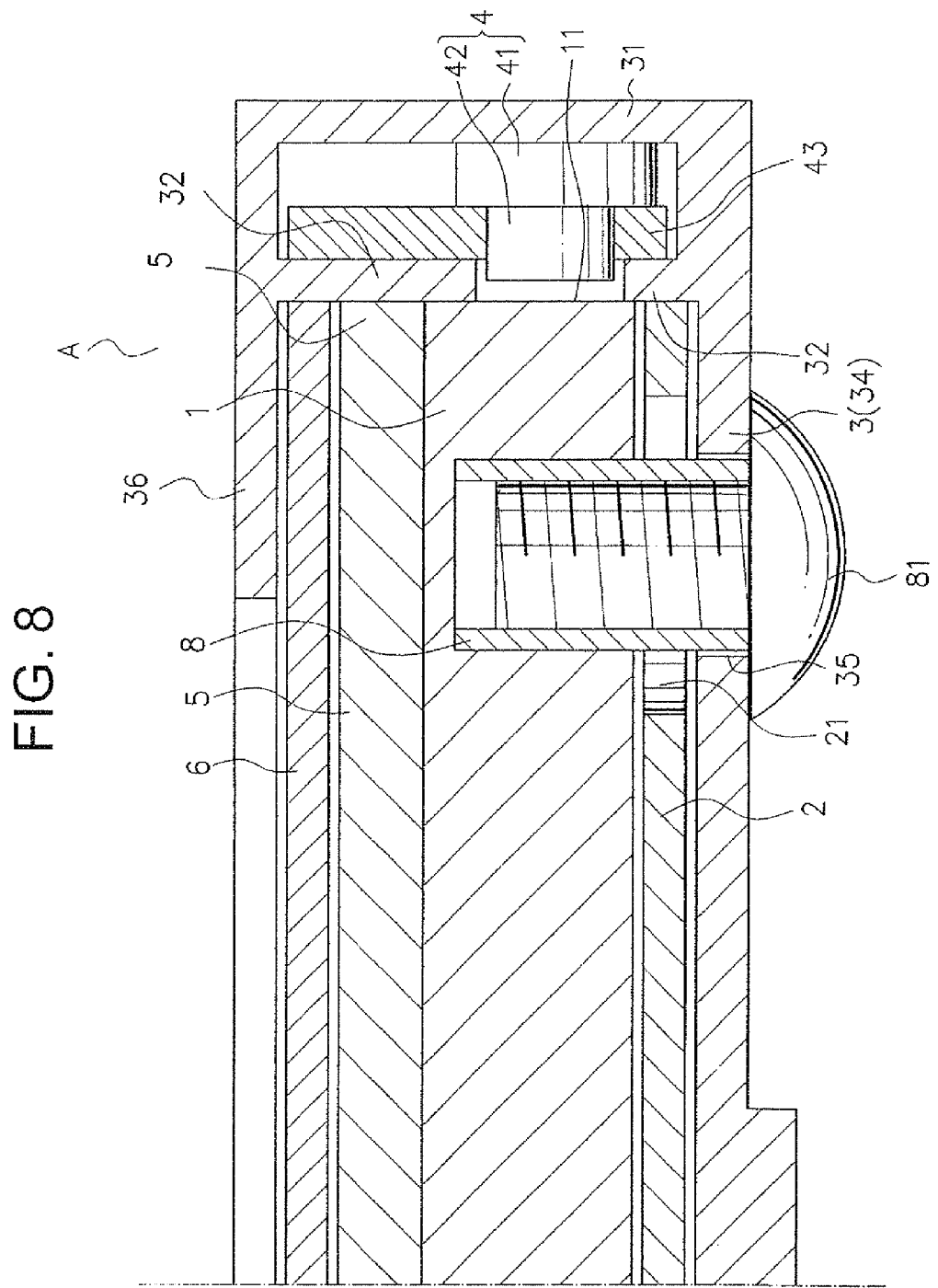
FIG. 8 is a partially transverse sectional view of the light guiding panel assembly according to another embodiment of the present invention.

FIG. 8 shows another embodiment of the present invention. In this embodiment, the light guiding panel assembly A includes a decoration plate 36 standing toward a front wall for covering an end at the incident end face 11, and is formed in a U-shape in a cross section, so that the light source holder 3 is also used as a frame.

In this embodiment, the light source holder 3 includes: the standing plate 34 having a large projection width; and a front-side decoration plate 36 having a smaller projection width at both ends of the light receiver 31 having the C-shaped section, and is formed in a U-shape in cross section. At this time, the width of the light receiver 31 is, for example, several mm larger than thicknesses of the front-side light diffuser panel 5 and the transparent cover 6. The decoration plate 36 is extended vertically from the end of the light receiver 31 to also cover the front-side incident end face 11 at the same time.

At the facing end face of the light guiding plate 1 perpendicular to the incident end face 11, the frame 7 having a U-shaped section similar to the light source holder 3 finishes the both ends of the light source holder 3 in the longitudinal direction to configure a front appearance similar to the above embodiment.

Because other elements are the same as the previous embodiment, the same reference numerals are added, and their explanations are omitted.

According to the above, in the light guiding panel assembly A, because the relative position between the incident end face 11 of the light guiding plate 1 and the light source holder 3 is kept unchanged, when the heat expansion or contraction occurs on the light guiding plate 1, the light source such as the LED unit 4 is prevented from being broken or damaged. Further, because the positional relationship between the incident end face 11 and the light receiver 31 of the light source holder 3 is always constant, a possibility to reduce the illumination brightness accompanying the heat expansion or contraction is canceled. In particular, using a synthetic resin made light guiding plate 1 having a large heat expansion or contraction, a large-sized light guiding panel assembly A with a simple structure surely having no trouble or no brightness reduction corresponding to heat expansion or contraction is attained.

Various embodiments can be made regarding the concrete shape, material, structure, relationship of the light guiding panel assembly, the light guiding plate, the base plate, the light source holder, the light receiver, the standing plate, the light source, the fittings, the insert-nut, the bolt, the decoration plate attached to the light source holder, the frame, the LED unit, the spacer for holding the LED unit, or the like when practicing the present invention without departing from the spirit or scope of the present invention. For example, the light source holder having the C-shaped section may be wider to receive a plurality of lines of the LED units arranged in parallel. For example, the four light source holders may be arranged in four sides of the light guiding plate. The two light source holders may be arranged in both ends in a height direction instead of the width direction. For example, the light source holder may be integrally fixed to the light guiding plate with a screw without using the insert-nut. A cold-cathode tube or bullet LEDs arranged in series may be used as the light source. The base plate may be a metallic reflective plate having high reflectivity.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A light guiding panel assembly used for a display, a signboard, a surface illumination or the like, comprising:
    a synthetic-resin-made light guiding plate for guiding incident light from a light source via an incident end face; and a light source holder extending to the incident end face of the guiding plate, wherein the light source holder integrally includes: a light source receiver having a light transparent hole at the incident end face side; and a standing plate standing from the light source receiver, and is formed in an L-shape, and wherein the light source is received in the light source receiver of the light source holder to provide the incident light to the incident end face, and the light guiding plate and the standing plate are movable, and the standing plate is integrally fixed to the light guiding plate, so that the light guiding holder can follow heat expansion or contraction of the light guiding plate, wherein the light source is an LED unit composed of LED chips arranged in series in a longitudinal direction of a substrate, and the light receiver of the light source holder is formed in a C-shape in a cross section having an open groove as a light transmitting hole, and wherein an end of the light guiding plate is operable to contact projections opposite to each other disposed at both ends of the opening groove, and spacers are provided on the substrate by a crossed-arrangement of the spacers on the substrate in between the LED chips and covered by the projections, thereby the LED unit is received in the light source receiver of the light source holder.

2. The light guiding panel assembly as claimed in claim 1, further comprising a base plate disposed on a rear wall of the guiding plate, wherein the standing plate is integrally fixed to the light guiding plate with a fitting, and the fitting is inserted into a through-hole or a through-groove allowing the fitting movable in a heat expansion direction of the light guiding plate disposed on the base plate.

3. The light guiding panel assembly as claimed in claim 1, wherein the standing plate is integrally fixed to the light guiding plate at a position adjacent to a corner of the light guiding plate, and the standing plate is movable from the position adjacent to the corner of the light guiding plate so that the light guiding holder can follow heat expansion or contraction of the light guiding plate at the position adjacent to the corner of the light guiding plate.

4. The light guiding panel assembly as claimed in claim 3, wherein the standing plate is integrally fixed to the light guiding plate at the position adjacent to the corner of the light guiding plate with a fitting inserted from a long hole in an oblique direction of the standing plate into the light guiding plate.

5. The light guiding panel assembly as claimed in claim 1, wherein the standing plate is integrally fixed to the light guiding plate with a bolt screwed from the standing plate into an insert-nut embedded in the light guiding plate.

6. The light guiding panel assembly as claimed in claim 1, wherein the light source holder includes a decoration plate standing toward a front wall of the light guiding plate for covering an end at the incident end face, and is formed in a U-shape in a cross section, so that the light source holder also serves as a frame.

7. The light guiding panel assembly as claimed in claim 1 further comprising:

a frame having a U-shaped section and disposed outside of the light source holder for covering an end of the light guiding panel assembly at the incident end face, and a rear-side standing wall of the frame is simultaneously fixed to the light guiding plate with a fitting together with the standing plate of the light source holder so that the frame can follow the heat expansion or contraction of the light guiding plate together with the light source holder.

* * * * *